(12) United States Patent
Tsai

(10) Patent No.: US 8,760,772 B2
(45) Date of Patent: Jun. 24, 2014

(54) PROJECTION ZOOM LENS

(75) Inventor: Ching-Feng Tsai, Taoyuan Hsien (TW)

(73) Assignee: Delta Electronics, Inc. (TW)

( * ) Notice: Subject to any disclaimer, the term of this patent is extended or adjusted under 35 U.S.C. 154(b) by 56 days.

(21) Appl. No.: 13/593,728

(22) Filed: Aug. 24, 2012

(65) Prior Publication Data

US 2013/0321930 A1    Dec. 5, 2013

(30) Foreign Application Priority Data

Jun. 5, 2012 (TW) .............................. 101120044 A

(51) Int. Cl.
*G02B 15/14* (2006.01)
*G02B 15/173* (2006.01)

(52) U.S. Cl.
CPC .................... *G02B 15/173* (2013.01)
USPC .......................................... 359/683; 359/649

(58) Field of Classification Search
USPC .................. 359/676, 683, 761, 649
See application file for complete search history.

(56) References Cited

U.S. PATENT DOCUMENTS

2002/0176058 A1* 11/2002 Yasui et al. ................... 353/100
2005/0243436 A1* 11/2005 Yasui ............................ 359/676
2007/0285802 A1* 12/2007 Sugita ........................... 359/689

* cited by examiner

*Primary Examiner* — William Choi
(74) *Attorney, Agent, or Firm* — Lowe Hauptman & Ham, LLP

(57) ABSTRACT

A projection zoom lens includes a front lens group, a rear lens group, and an aperture stop. The front lens group has negative refractive power and is disposed adjacent to an object side of the projection zoom lens. The front lens group includes a first lens group, a second lens group, and a third lens group. The rear lens group has positive refractive power and is disposed adjacent to an image side of the projection zoom lens. The rear lens group includes a fourth lens group, a fifth lens group, and a sixth lens group. The aperture stop is disposed between the front lens group and the rear lens group. The third lens group, the fourth lens group, and the fifth lens group move along an optical axis of the projection zoom lens to change an effective focal length of the projection zoom lens when the projection zoom lens zooms.

9 Claims, 12 Drawing Sheets

… (1)

PROJECTION ZOOM LENS

RELATED APPLICATIONS

This application claims priority to Taiwan Application Serial Number 101120044, filed Jun. 5, 2012, which is herein incorporated by reference.

BACKGROUND

1. Technical Field

The present disclosure relates to projection zoom lenses.

2. Description of Related Art

In a typical projector, a projection lens must have a sufficient back focal length to allow a prism to be disposed between the projection lens and a digital micro-mirror device. Therefore, a reverse telephoto lens is utilized as the basic is optical framework of the projection lens because of its long back focal length.

However, since the front lens group and the rear lens group of a reverse telephoto lens are asymmetrical relative to an aperture stop, coma, lateral color and distortion problems occur easily. Therefore, many in the industry are striving to provide an image quality with a high resolution and low distortion under conditions where there is a sufficient back focal length.

SUMMARY

According to one embodiment of the present invention, a projection zoom lens includes a front lens group with negative refractive power, a rear lens group with positive refractive power and an aperture stop. The front lens group is disposed adjacent to an object side of the projection zoom lens, the rear lens group is disposed adjacent to an image side of the projection zoom lens, and the aperture stop is disposed between the front lens group and rear lens group. The front lens group includes a first lens group with negative refractive power, a second lens group with positive refractive power, and a third lens group with positive refractive power. The rear lens group includes a fourth lens group with negative refractive power, a fifth lens group with positive refractive power, and a sixth lens group with positive refractive power. The first lens group is disposed adjacent to the object side of the projection zoom lens, the second lens group is disposed adjacent to the image side of the first lens group, the third lens group is disposed adjacent to the image side of the second lens group, the fourth lens group is disposed adjacent to the image side of the third lens group, the fifth lens group is disposed adjacent to the image side of the fourth lens group, and the sixth lens group is disposed adjacent to the image side of the projection zoom lens. The third lens group, the fourth lens group, and the fifth lens group move along the optical axis of the projection zoom lens to change an effective focal length of the projection zoom lens during zooming of the projection zoom lens.

In one or more embodiments of the present invention, the first lens group optionally includes a first lens, a second lens, a third lens, and a fourth lens. The first lens is a convex-concave lens with negative refractive power disposed adjacent to the object side of the projection zoom lens. The second lens is a biconvex lens with positive refractive power disposed adjacent to an image side of the first lens. The third lens is a convex-concave lens with negative refractive power disposed adjacent to an image side of the second lens. The fourth lens is a biconcave lens with negative refractive power disposed adjacent to an image side of the third lens.

In one or more embodiments of the present invention, the second lens group optionally includes a fifth lens and a sixth lens. The fifth lens is a biconcave lens with negative refractive power disposed adjacent to the image side of the first lens group, and the sixth lens is a biconvex lens with positive refractive power disposed adjacent to an image side of the fifth lens. The fifth lens and the sixth lens are paired together to form a doublet lens.

In one or more embodiments of the present invention, the third lens group optionally includes a seventh lens which is a biconvex lens with positive refractive power disposed adjacent to the image side of the second lens group.

In one or more embodiment of the present invention, the fourth lens group optionally includes an eighth lens and a ninth lens. The eighth lens is a biconcave lens with negative refractive power disposed adjacent to the image side of the third lens group. The ninth lens is a biconvex lens with positive refractive power disposed adjacent to an image side of the eighth lens.

In one or more embodiments of the present invention, the fifth lens group optionally includes a tenth lens and an eleventh lens. The tenth lens is a biconcave lens with negative refractive power disposed adjacent to the image side of the fourth lens group, and the eleventh lens is a biconvex lens with positive refractive power disposed adjacent to an image side of the tenth lens.

In one or more embodiments of the present invention, the sixth lens group optionally includes a twelfth lens, a thirteenth lens, a fourteenth lens, and a fifteenth lens. The twelfth lens is a biconcave lens with negative refractive power disposed adjacent to an image side of the fifth lens group. The thirteenth lens is a biconvex lens with positive refractive power disposed adjacent to an image side of the twelfth lens. The twelfth lens and the thirteenth lens are paired together to form an achromatic lens. The fourteenth lens is a biconvex lens with positive refractive power disposed adjacent to an image side of the thirteenth lens. The fifteenth lens is a biconvex lens with positive refractive power disposed adjacent to the image side of the projection zoom lens. The material of the twelfth lens is flint glass, and the material of the thirteenth lens is crown glass.

In one or more embodiments of the present invention, the third lens group, the fourth lens group, and the fifth lens group optionally move toward the object side of the projection zoom lens along the optical axis of the projection zoom lens during zooming of the projection zoom lens from a wide-angle position toward a telephoto position, and the moving distances of the third lens group, the fourth lens group, and the fifth lens group are different from each other. The third lens group, the fourth lens group, and the fifth lens group optionally move toward the image side of the projection zoom lens along the optical axis of the projection zoom lens during zooming of the projection zoom lens zooms from a telephoto position to a wide-angle position, and the moving distances of the third lens group, the fourth lens group, and the fifth lens group are different from each other. The second lens is movable in order to compensate for a shift of a focal plane of the projection zoom lens.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically depicted in order to simplify the drawings.

Figure 1:
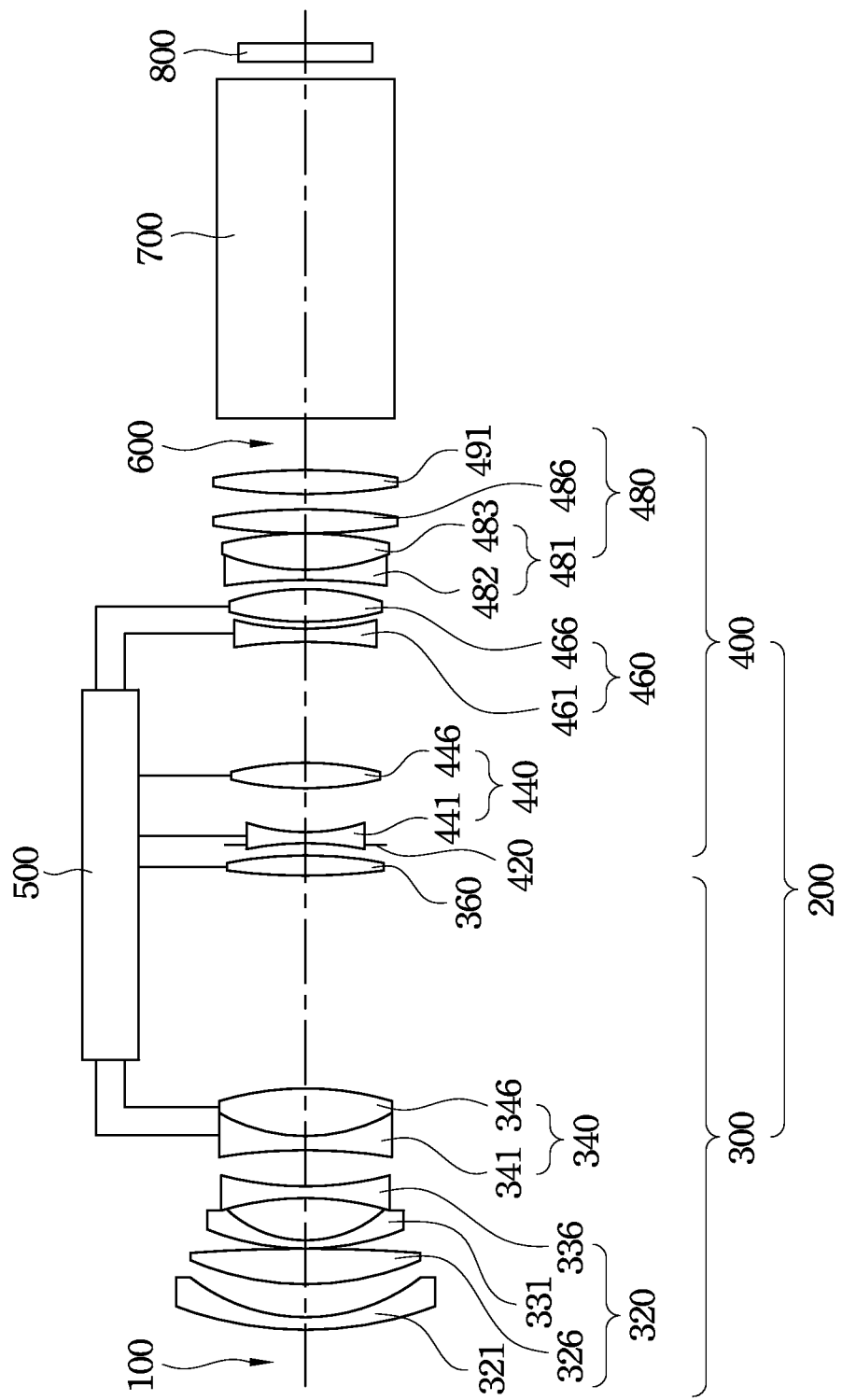
FIG. 1 is a schematic diagram of a projector at a wide-angle position according to one embodiment of present invention.
Figure 2:
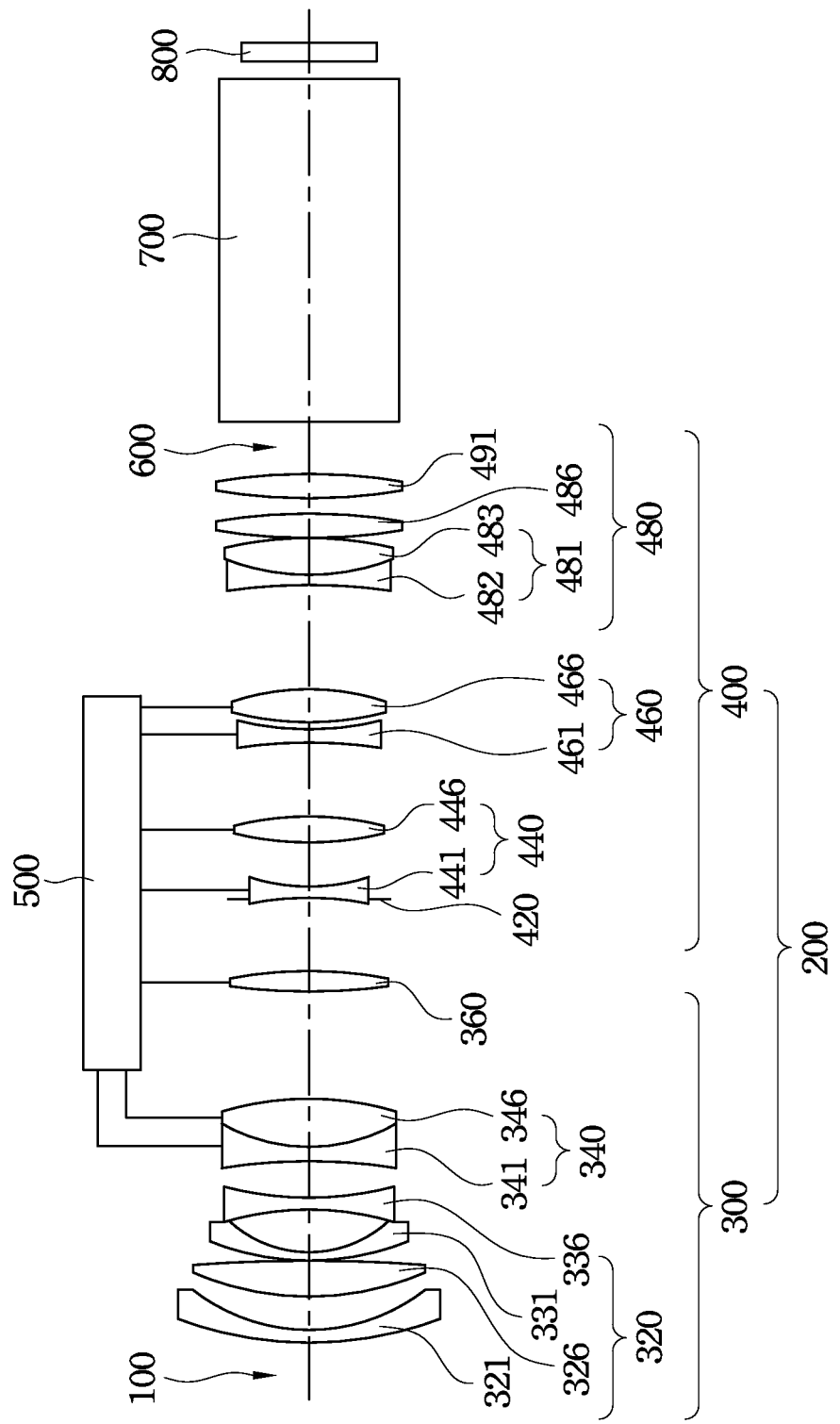
FIG. 2 is a schematic diagram of the projector of FIG. 1 at a telephoto position.

FIG. 1 is a schematic diagram of a projector at a wide-angle position according to one embodiment of present invention. FIG. 2 is a schematic diagram of the projector of FIG. 1 at a telephoto position. As shown in FIGS. 1 and 2, the projector includes a projection zoom lens 200, a micro-display device 800, and an X-prism 700 disposed between the projection zoom lens 200 and the micro-display device 800. The X-prism 700 may be an X-prism utilized in a three-chip micro-display device. The micro-display device 800 may be a digital micro-mirror device (DMD) which provides projected images by digital light processing (DLP).

The projected images are projected onto a projected screen through the X-prism 700 and the projection zoom lens 200. It is noted that, in the present disclosure, in the view of the reversibility of the path along which light travels, the side closest to the projected screen is defined as an object side 100, and the side closest to the micro-display device 800 is defined as an image side 600 to thereby conform with traditional optical design practices and provide convenience in optical design evaluations. Moreover, the object side 100 and the image side 600 may be used to describe relative positions for each of the lens groups or each of the lenses. That is, for a lens group or a lens, the portion thereof closest to the projected screen is described as being adjacent to the object side 100, and the portion thereof closest to the micro-display device 800 is described as being adjacent to the image side 600.

In one embodiment of the invention, the basic optical structure of the projection zoom lens 200 is that of a reverse telephoto lens in order to ensure a sufficient back focus length. The projection zoom lens 200 includes a front lens group 300 with negative refractive power, and a rear lens group 400 with positive refractive power, and an aperture stop 420. The front lens group 300 is disposed adjacent to the object side 100 of the projection zoom lens 200, and the rear lens group 400 is disposed adjacent to the image side 600 of the projection zoom lens 200. The aperture stop 420 is disposed between the front lens group 300 and the rear lens group 400, and functions to limit the bundles of light which go through the optical system. The front lens group 300 includes a first lens group 320 with negative refractive power, a second lens group 340 with positive refractive power, and a third lens group 360 with positive refractive power. The first lens group 320 is disposed adjacent to the object side 100 of the projection zoom lens 200 for collecting light from the object side 100 and directing the light into the projection zoom lens 200, and for correcting image distortion. The second lens group 340 is disposed adjacent to the image side 600 of the first lens group 320 for collecting light. The third lens group 360 is disposed adjacent to the image side 600 of the second lens group 340 for further collecting light and guiding the light toward the aperture stop 420, such that the light can be utilized effectively.

The first lens group 320 includes a first lens 321, a second lens 326, a third lens 331, and a fourth lens 336. The first lens 321 is a convex-concave lens with negative refractive power, and this first lens 321 is disposed adjacent to the object side 100 of the projection zoom lens 200. The second lens 326 is a biconvex lens with positive refractive power, and this second lens 326 is disposed adjacent to the image side 600 of the first lens 321. The third lens 331 is a convex-concave lens with negative refractive power, and this third lens 331 is disposed adjacent to the image side 600 of the second lens 326. The fourth lens 336 is a biconcave lens with negative refractive power, and this fourth lens 336 is disposed adjacent to the image side 600 of the third lens 331.

The second lens group 340 includes a fifth lens 341 and a sixth lens 346. The fifth lens 341 is a biconcave lens with negative refractive power, and this fifth lens 341 is disposed adjacent to the image side 600 of the first lens group 320. The sixth lens 346 is a biconvex lens with positive refractive power, and this sixth lens 346 is disposed adjacent to the image side 600 of the fifth lens 341. The fifth lens 341 and the sixth lens 346 are paired together to form a doublet lens.

The third lens group 360 includes a seventh lens 360. The seventh lens 360 is a biconvex lens with positive refractive power, and this seventh lens 360 is disposed adjacent to the image side 600 of the second lens group 340.

The rear lens group 400 includes a fourth lens group 440 with negative refractive power, a fifth lens group 460 with positive refractive power, and a sixth lens group 480 with positive refractive power. The fourth lens group 440 is disposed adjacent to the image side 600 of the third lens group 360, and this fourth lens group 440 has low refractive power mainly for aberration correction. The fifth lens group 460 is disposed adjacent to the image side 600 of the fourth lens group 440, and this fifth lens group 460 has low refractive power mainly for aberration correction. The sixth lens group 480 is disposed adjacent to the image side 600 of the projection zoom lens 200 for guiding and focusing the light to the image side 600 to provide a focusing image, and also for correcting the lateral chromatic aberration and the axial color aberration of the optical system to increase the image quality of the projection zoom lens 200.

The fourth lens group 440 includes an eighth lens 441 and a ninth lens 446. The eighth lens 441 is a biconcave lens with negative refractive power, and this eighth lens 441 is disposed adjacent to the image side 600 of the third lens group 360. The ninth lens 446 is a biconvex lens with positive refractive power, and this ninth lens 446 is disposed adjacent to the image side 600 of the eighth lens 441.

The fifth lens group 460 includes a tenth lens 461 and an eleventh lens 466. The tenth lens 461 is a biconcave lens with negative refractive power, and this tenth lens 461 is disposed adjacent to the image side 600 of the fourth lens group 440. The eleventh lens 466 is a biconvex lens with positive refractive power, and this eleventh lens 466 is disposed adjacent to the image side 600 of the tenth lens 461.

The sixth lens group 480 includes a twelfth lens 482, a thirteenth lens 483, a fourteenth lens 486, and a fifteenth lens 491. The twelfth lens 482 is a biconcave lens with negative refractive power, and this twelfth lens 482 is disposed adjacent to the image side 600 of the fifth lens group 460. The thirteenth lens 483 is a biconvex lens with positive refractive power, and this thirteenth lens 483 is disposed adjacent to the image side 600 of the twelfth lens 482. The twelfth lens 482 and the thirteenth lens 483 are paired together to form an achromatic lens in order to compensate for the axial color aberration caused by the long back focus length structure. The fourteenth lens 486 is a biconvex lens with positive refractive power, and this fourteenth lens 486 is disposed adjacent to the image side 600 of the thirteenth lens 483. The fifteenth lens 491 is a biconvex lens with positive refractive power, and this fifteenth lens 491 is disposed adjacent to the image side 600 of the projection zoom lens 200.

The material of the twelfth lens 482 is flint glass with a high refractive index, and the material of the thirteenth lens 483 is crown glass with a low refractive index and high Abbe number. Both the fourteenth lens 486 and the fifteenth lens 491 are made of low dispersion materials with a high Abbe number.

In one embodiment of the invention, the second lens group 340, the third lens group 360, the fourth lens group 440, and the fifth lens group 460 are movable during zooming of the projection zoom lens 200. The movement of the second lens group 340, the third lens group 360, the fourth lens group 440, and the fifth lens group 460 can be effected by a zoom mechanism 500 which can be a rail system including cams and carriages.

During zooming of the projection zoom lens 200 from the wide-angle position toward the telephoto position, the zoom mechanism 500 is operative to move each of the third lens group 360, the fourth lens group 440, and the fifth lens group 460 toward the object side 100 of the projection zoom lens 200 along an optical axis of the projection zoom lens 200 to change the effective focal length of the projection zoom lens 200, and the moving distances of the third lens group 360, the fourth lens group 440, and the fifth lens group 460 are different from each other. The zoom mechanism 500 is further operative to move the second lens group 340 to compensate for a shift of a focus plane of the projection zoom lens 200.

In contrast, during zooming of the projection zoom lens 200 from the telephoto position toward the wide-angle position, the zoom mechanism 500 is operative to move each of the third lens group 360, the fourth lens group 440, and the fifth lens group 460 toward the image side 600 of the projection zoom lens 200 along the optical axis of the projection zoom lens 200 to change the effective focal length of the projection zoom lens 200, and the moving distances of the third lens group 360, the fourth lens group 440, and the fifth lens group 460 are different from each other. The zoom mechanism 500 is further operative to move the second lens group 340 to compensate for the shift of focus plane of the projection zoom lens 200.

Table 1 lists parameter values of every element of the projection zoom lens 200 at the wide-angle position according to one example of present invention. These parameter values include the radius curvature of each surface, the distance between each surface and the next surface, the reflective index of each element, and the Abbe number of each element. The surfaces of every element are referred to in order as surface 1 to surface 32 from the object side 100 to the image side 600. For example, the surface of the first lens 321 closest to the object side 100 of the projection zoom lens 200 is referred to as surface 1, the surface of the first lens 321 closest to the second lens 326 is referred to as surface 2, the surface of the second lens 326 closest to the first lens 321 is referred to as surface 3, and so on.

TABLE 1

Parameter Values of Every Element of Projection Zoom Lens 200 at Wide-Angle Position

| Surface | Radius curvature (mm) | Distance to the next surface (mm) | Refractive index | Abbe number |
|---|---|---|---|---|
| 1 | 77.542 | 2.45 | 1.805181 | 25.425363 |
| 2 | 37.848 | 6.80 | | |
| 3 | 59.680 | 7.50 | 1.834 | 37.160487 |
| 4 | −487.505 | 0.20 | | |
| 5 | 56.100 | 1.50 | 1.622992 | 58.165763 |
| 6 | 24.628 | 9.33 | | |
| 7 | −61.838 | 1.50 | 1.658441 | 50.877554 |
| 8 | 61.838 | 7.971 | | |
| 9 | −127.780 | 2.50 | 1.717362 | 29.518091 |
| 10 | 35.165 | 10.35 | 1.834 | 37.160487 |
| 11 | −60.706 | 43.37 | | |
| 12 | 147.900 | 4.40 | 1.72342 | 37.955602 |
| 13 | −90.000 | 2.94 | | |
| 14 | −72.086 | 1.50 | 1.772499 | 49.598371 |
| 15 | 45.276 | 9.52 | | |
| 16 | 78.554 | 4.85 | 1.784723 | 25.683446 |
| 17 | −78.554 | 25.48 | | |
| 18 | −147.900 | 2.10 | 1.784723 | 25.683446 |
| 19 | 77.554 | 1.55 | | |
| 20 | 68.730 | 7.15 | 1.496999 | 81.545888 |
| 21 | −51.729 | 2 | | |
| 22 | −134.263 | 1.70 | 1.834 | 37.160487 |
| 23 | 47.424 | 7.35 | 1.496999 | 81.545888 |
| 24 | −106.290 | 0.15 | | |
| 25 | 116.334 | 5.60 | 1.496999 | 81.545888 |
| 26 | −98.288 | 1.97 | | |
| 27 | 98.288 | 5.60 | 1.496999 | 81.545888 |
| 28 | −116.334 | 10.71 | | |
| 29 | infinite (X-prism 700) | 70.00 | 1.51633 | 64.142022 |
| 30 | infinite (X-prism 700) | 3.52 | | |
| 31 | infinite (cover glass) | 3.00 | 1.48749 | 70.236252 |
| 32 | infinite (cover glass) | 0.48 | | |

Figure 3:
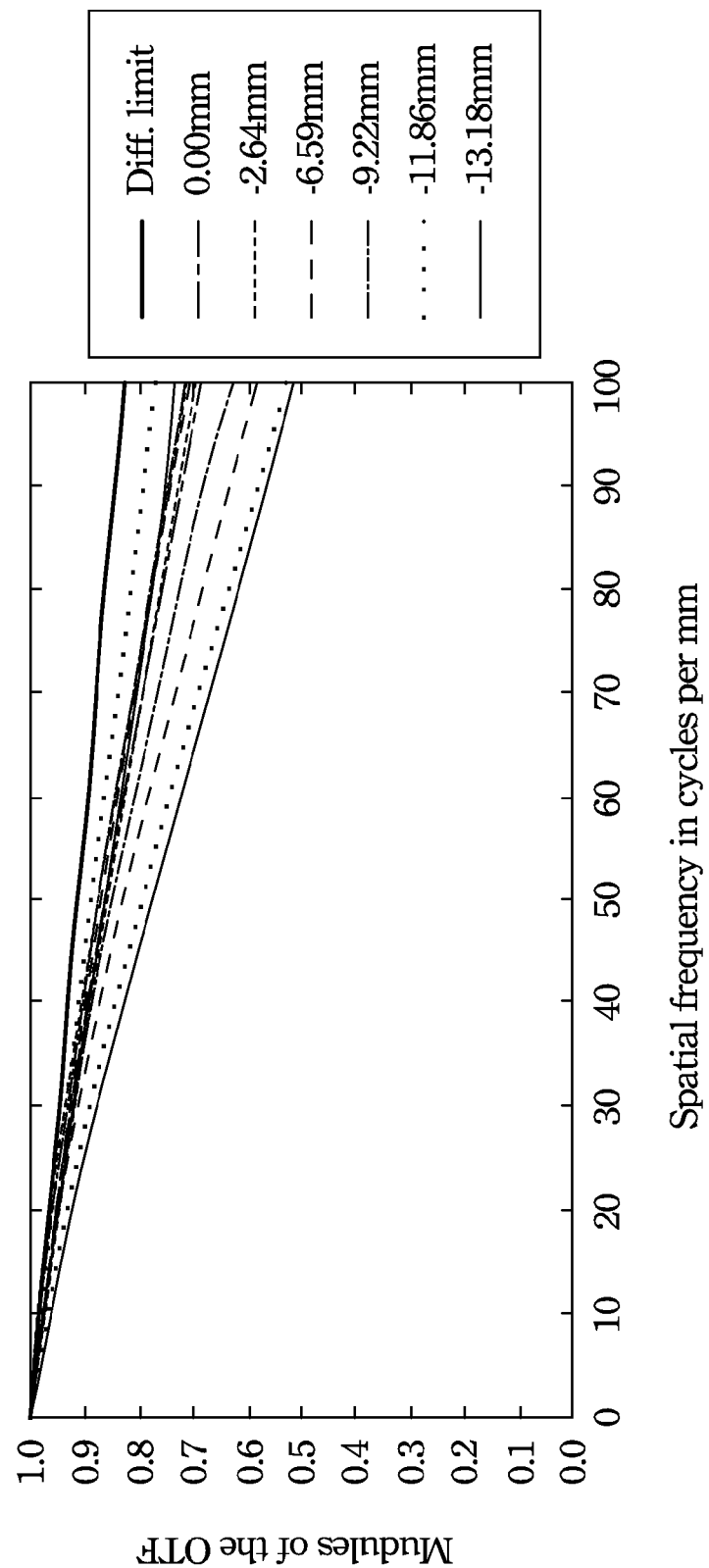
FIG. 3 shows a modulation transfer function (MTF) of a projection zoom lens of the projector of FIG. 1 at the wide-angle position and with parameter values listed in Table 1.

FIG. 3 shows a modulation transfer function (MTF) of the projection zoom lens 200 of the projector of FIG. 1 at the wide-angle position and with the parameter values listed in Table 1. As shown in FIG. 3, the resolutions at different image heights on the image surface are larger than 50% under a spatial frequency of 100 cycles per mm.

Figure 4:
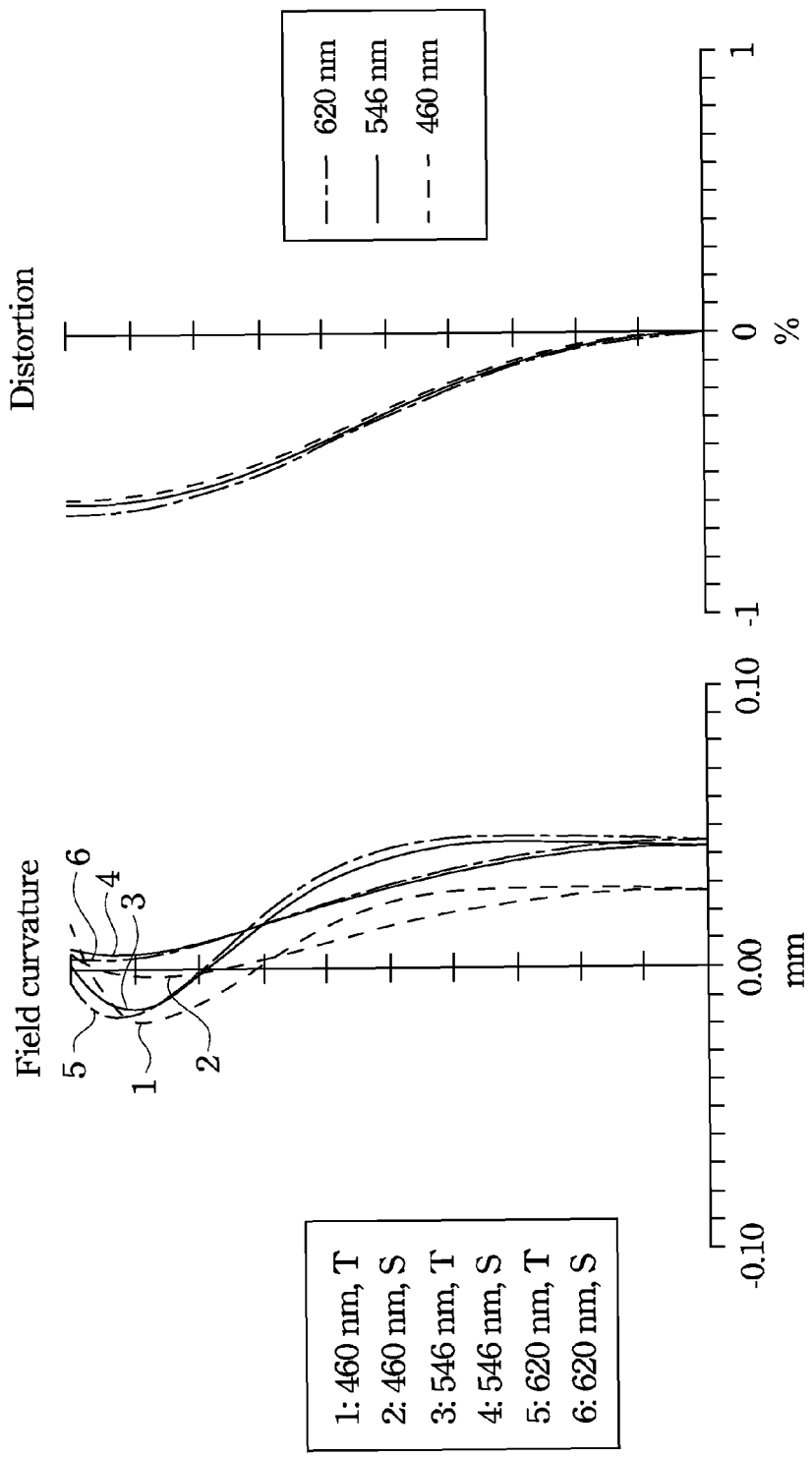
FIG. 4 shows field curvatures and distortion curves of the projection zoom lens of the projector of FIG. 1 at the wide-angle position and with the parameter values listed in Table 1.

FIG. 4 shows field curvatures and distortion curves of the projection zoom lens 200 of the projector of FIG. 1 at the wide-angle position and with the parameter values listed in Table 1. As shown in FIG. 4, the blue field curvatures (the wavelength is 460 nm in this example), the green field curvatures (the wavelength is 546 nm in this example), and the red field curvatures (the wavelength is 620 nm in this example) are all below 0.05 mm, and the blue distortion (the wavelength is 460 nm in this example), the green distortion (the wavelength is 546 nm in this example), and the red distortion (the wavelength is 620 nm in this example) are all below 0.7%.

Figure 5:
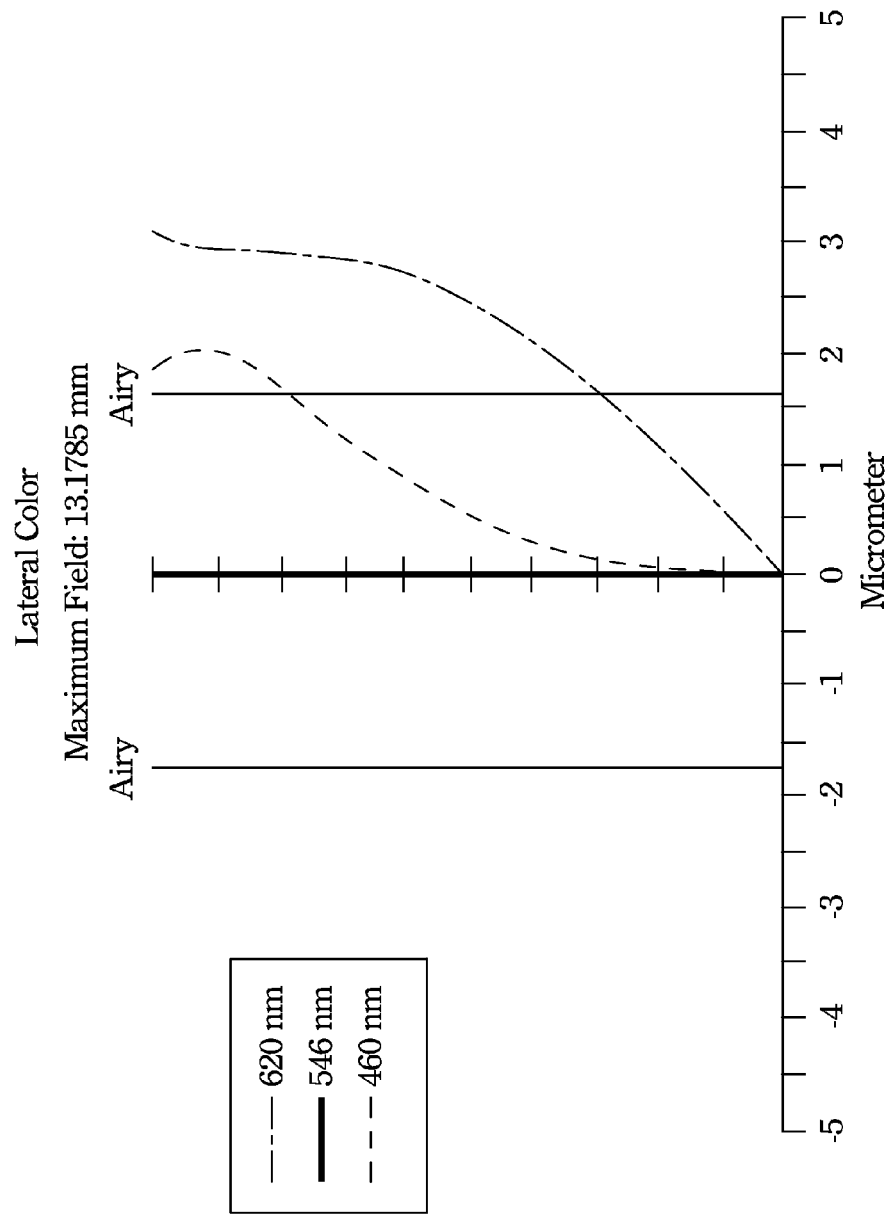
FIG. 5 shows a lateral chromatic aberration of the projection zoom lens of the projector of FIG. 1 at the wide-angle position and with the parameter values listed in Table 1.

FIG. 5 shows a lateral chromatic aberration of the projection zoom lens 200 of the projector of FIG. 1 at the wide-angle position and with the parameter values listed in Table 1. As shown in FIG. 5, assuming that the green plane (the wavelength is 546 nm in this example) is in focus, the blue plane (the wavelength is 460 nm in this example) and the red plane (the wavelength is 620 nm in this example) are defocused by less than 3 µm.

Figure 6:
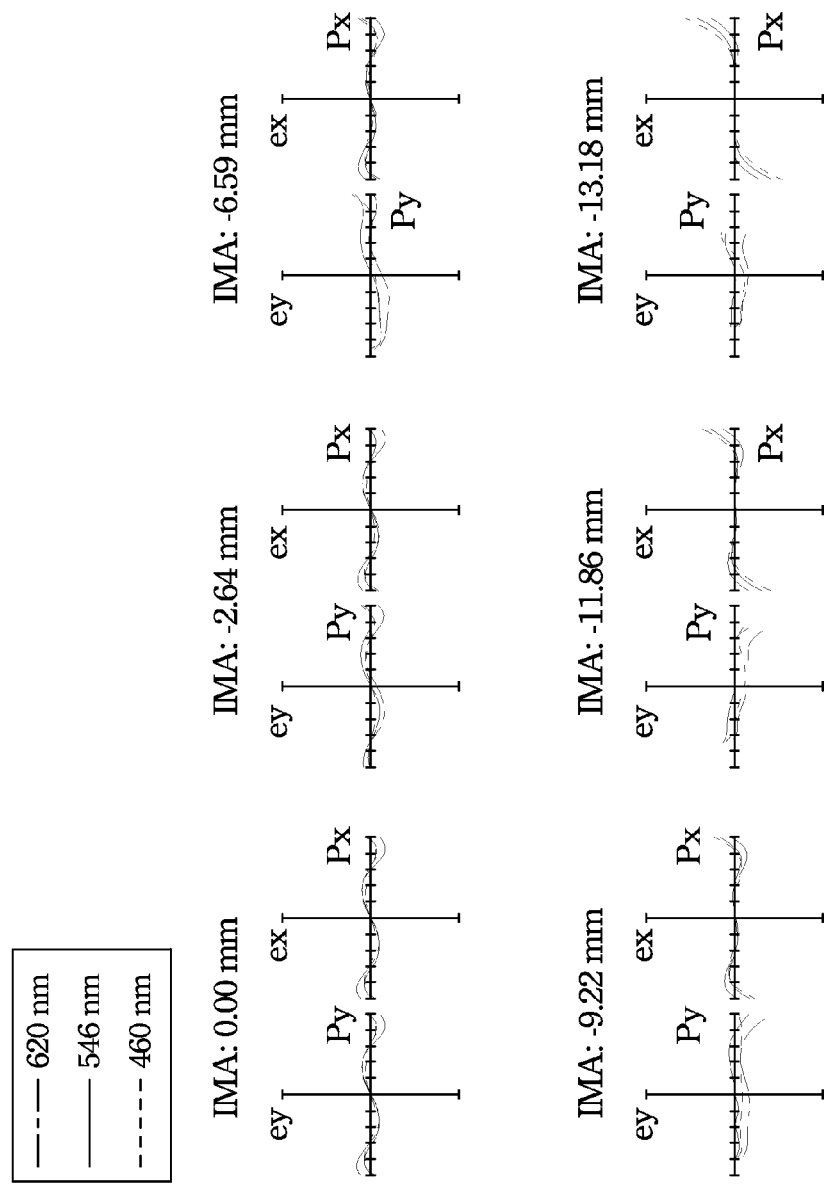
FIG. 6 shows transverse ray fan plots of the projection zoom lens of the projector of FIG. 1 at the wide-angle position and with the parameter values listed in Table 1.

FIG. 6 shows transverse ray fan plots of the projection zoom lens 200 of the projector of FIG. 1 at the wide-angle position and with the parameter values listed in Table 1, wherein the transverse ray fan plots are obtained at different image heights of the image surface. As shown in FIG. 6, the spherical aberration, chromatic aberration, and the coma for blue light (the wavelength is 460 nm in this example), green light (the wavelength is 546 nm in this example), and red light (the wavelength is 620 nm in this example) are all well controlled.

Figure 7:
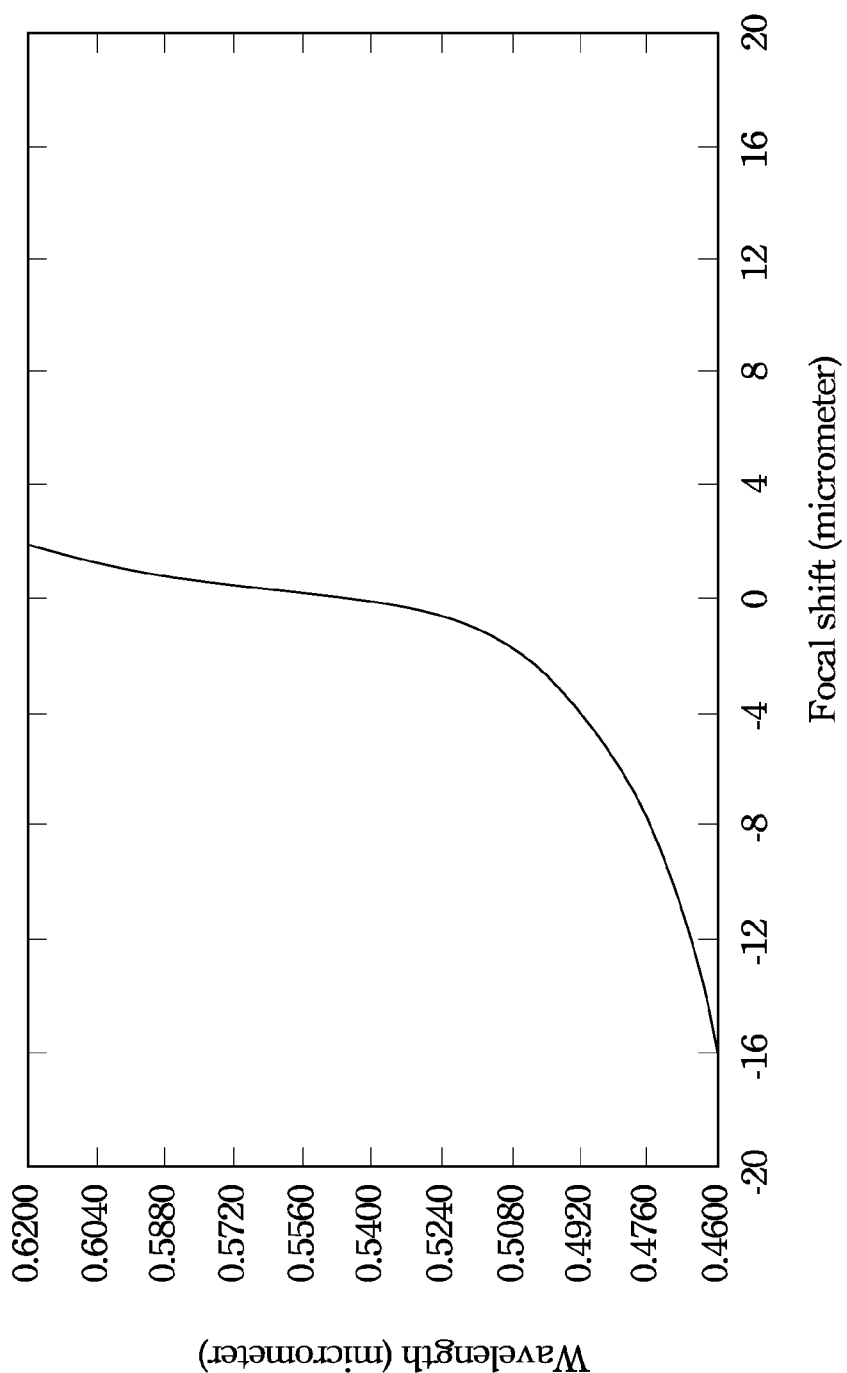
FIG. 7 shows chromatic focal shifts of the projection zoom lens of the projector of FIG. 1 at the wide-angle position and with the parameter values listed in Table 1.

FIG. 7 shows chromatic focal shifts of the projection zoom lens 200 of the projector of FIG. 1 at the wide-angle position and with the parameter values listed in Table 1, wherein the chromatic focal shifts are obtained at different visible light wavelengths. As shown in FIG. 7, the focal shifts are below 16 µm.

Table 2 lists parameter values of every element of the projection zoom lens 200 at the telephoto position according to one example of present invention. These parameter values include the radius curvature of each surface, the distance between each surface and the next surface, the reflective index of each element, and the Abbe number of each element. The surfaces of every element are referred to in order as surface 1 to surface 32 from the object side 100 to the image side 600. For example, the surface of the first lens 321 closest to the object side 100 of the projection zoom lens 200 is referred to as surface 1, the surface of the first lens 321 closest to the second lens 326 is referred to as surface 2, the surface of the second lens 326 closest to the first lens 321 is referred to as surface 3, and so on.

TABLE 2

Parameter Values of Every Element of Projection Zoom Lens 200 at Telephoto Position

| Surfaces | Radius curvature (mm) | Distance to the next surface (mm) | Refractive index | Abbe number |
|---|---|---|---|---|
| 1 | 77.542 | 2.45 | 1.805181 | 25.425363 |
| 2 | 37.848 | 6.80 | | |
| 3 | 59.680 | 7.50 | 1.834 | 37.160487 |
| 4 | −487.505 | 0.20 | | |
| 5 | 56.100 | 1.50 | 1.622992 | 58.165763 |
| 6 | 24.628 | 9.33 | | |
| 7 | −61.838 | 1.50 | 1.658441 | 50.877554 |
| 8 | 61.838 | 6.356 | | |
| 9 | −127.780 | 2.50 | 1.717362 | 29.518091 |
| 10 | 35.165 | 10.35 | 1.834 | 37.160487 |
| 11 | −60.706 | 28.71 | | |
| 12 | 147.900 | 4.40 | 1.72342 | 37.955602 |
| 13 | −90.000 | 18.34 | | |
| 14 | −72.086 | 1.50 | 1.772499 | 49.598371 |
| 15 | 45.276 | 9.52 | | |
| 16 | 78.554 | 4.85 | 1.784723 | 25.683446 |
| 17 | −78.554 | 10.36 | | |
| 18 | −147.900 | 2.10 | 1.784723 | 25.683446 |
| 19 | 77.554 | 1.55 | | |
| 20 | 68.730 | 7.15 | 1.496999 | 81.545888 |
| 21 | −51.729 | 18 | | |
| 22 | −134.263 | 1.70 | 1.834 | 37.160487 |
| 23 | 47.424 | 7.35 | 1.496999 | 81.545888 |
| 24 | −106.290 | 0.15 | | |
| 25 | 116.334 | 5.60 | 1.496999 | 81.545888 |
| 26 | −98.288 | 1.97 | | |
| 27 | 98.288 | 5.60 | 1.496999 | 81.545888 |
| 28 | −116.334 | 10.71 | | |
| 29 | infinite (X-prism 700) | 70.00 | 1.51633 | 64.142022 |
| 30 | infinite (X-prism 700) | 3.52 | | |
| 31 | infinite (cover glass) | 3.00 | 1.48749 | 70.236252 |
| 32 | infinite (cover glass) | 0.48 | | |

Figure 8:
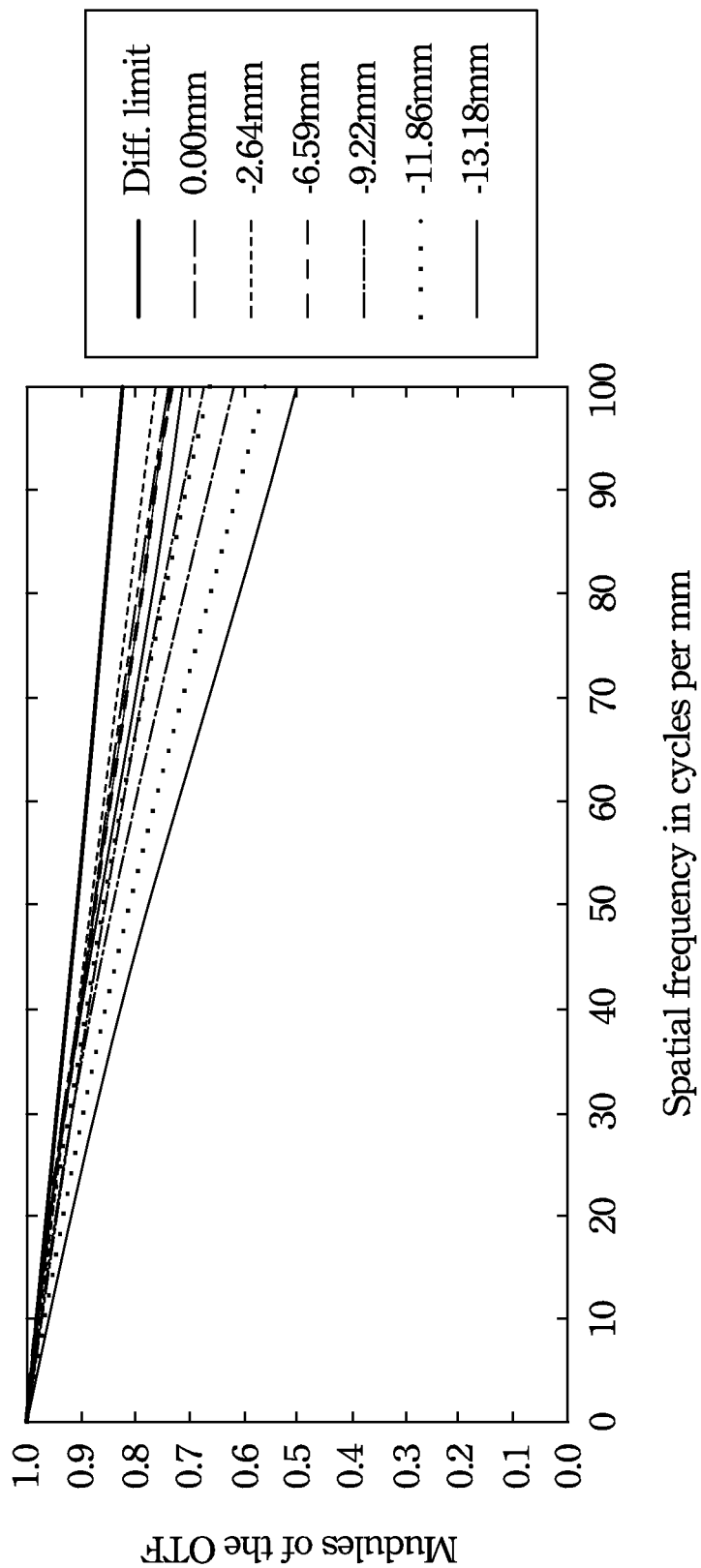
FIG. 8 shows a modulation transfer function (MTF) of the projection zoom lens of the projector of FIG. 2 at the telephoto position and with parameter values listed in Table 2.

FIG. 8 shows a modulation transfer function (MTF) of the projection zoom lens 200 of the projector of FIG. 2 at the telephoto position and with the parameter values listed in Table 2. As shown in FIG. 8, the resolutions at different image heights on the image surface are larger than 50% under a spatial frequency of 100 cycles per mm.

Figure 9:
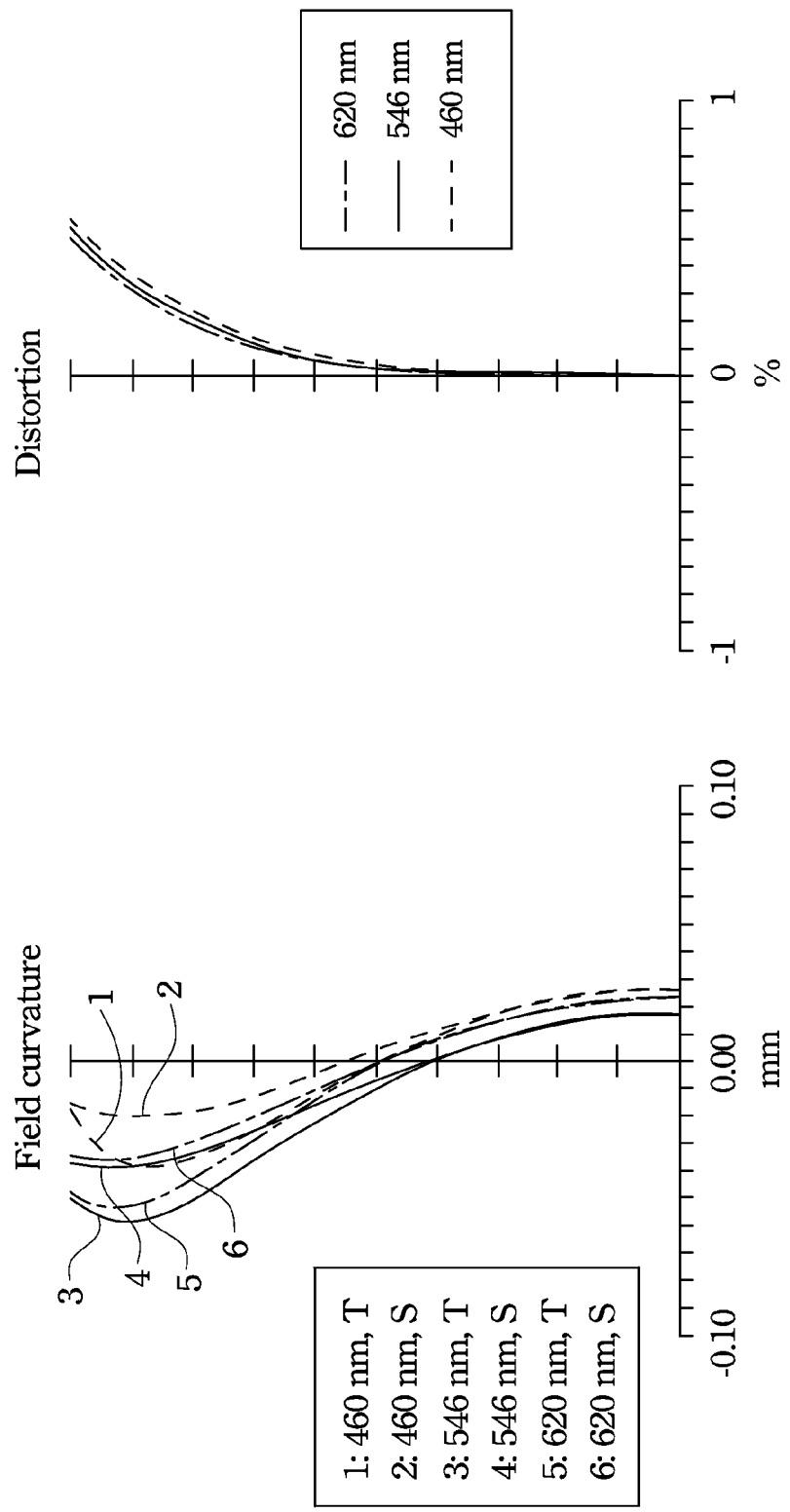
FIG. 9 shows field curvatures and distortion curves of the projection zoom lens of the projector of FIG. 2 at the telephoto position and with the parameter values listed in Table 2.

FIG. 9 shows field curvatures and distortion curves of the projection zoom lens 200 of the projector of FIG. 2 at the telephoto position and with the parameter values listed in Table 2. As shown in FIG. 9, the blue field curvatures (the wavelength is 460 nm in this example), the green field curvatures (the wavelength is 546 nm in this example), and the red field curvatures (the wavelength is 620 nm in this example) are all below 0.06 mm, and the blue distortion (the wavelength is 460 nm in this example), the green distortion (the wavelength is 546 nm in this example), and the red distortion (the wavelength is 620 nm in this example) are all below 0.6%.

Figure 10:
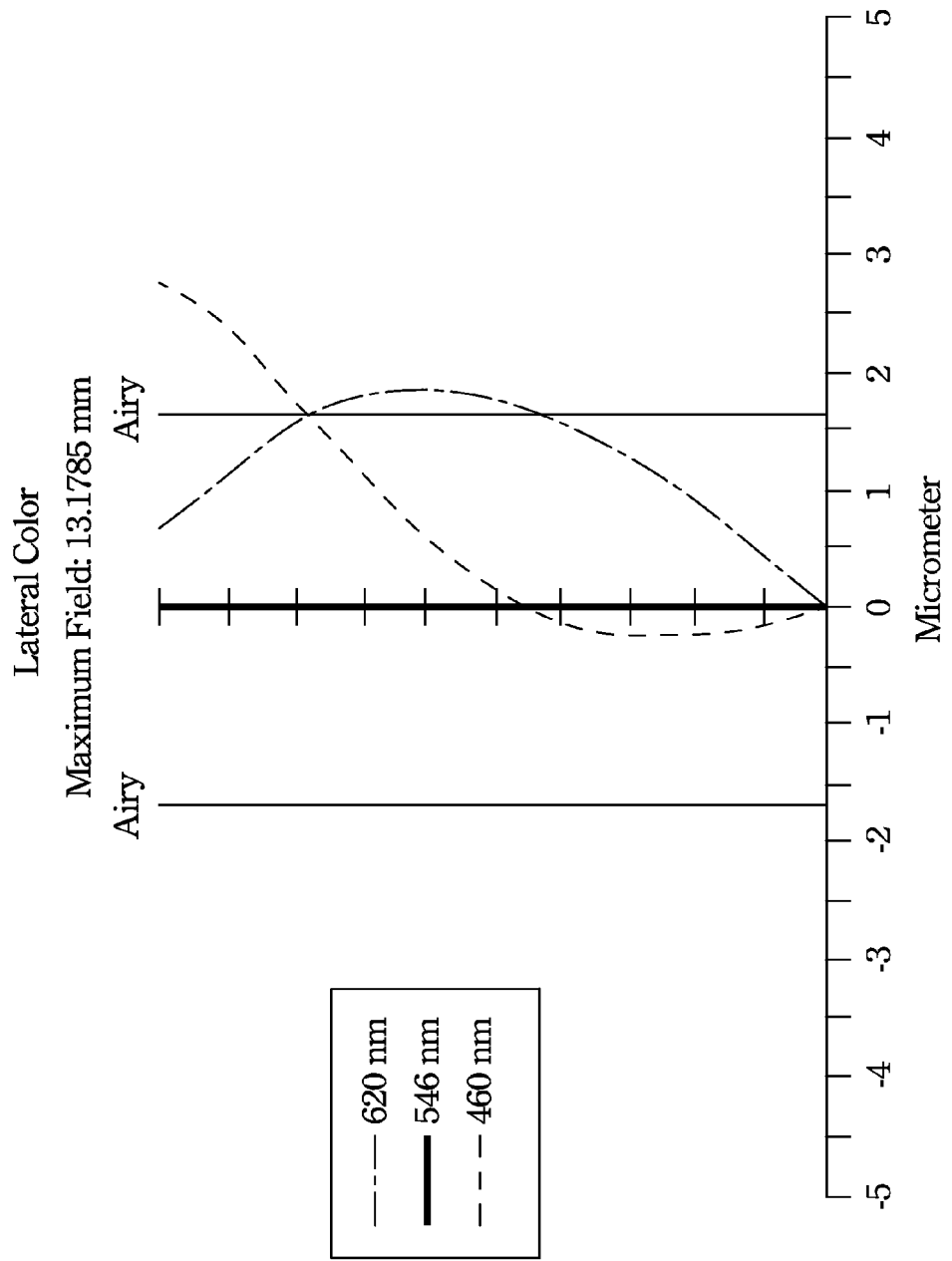
FIG. 10 shows a lateral chromatic aberration of the projection zoom lens of the projector of FIG. 2 at the telephoto position and with the parameter values listed in Table 2.

FIG. 10 shows a lateral chromatic aberration of the projection zoom lens 200 of the projector of FIG. 2 at the telephoto position and with the parameter values listed in Table 2. As shown in FIG. 10, assuming that the green plane (the wavelength is 546 nm in this example) is in focus, the blue plane (the wavelength is 460 nm in this example) and the red plane (the wavelength is 620 nm in this example) are defocused by less than 3 µm.

Figure 11:
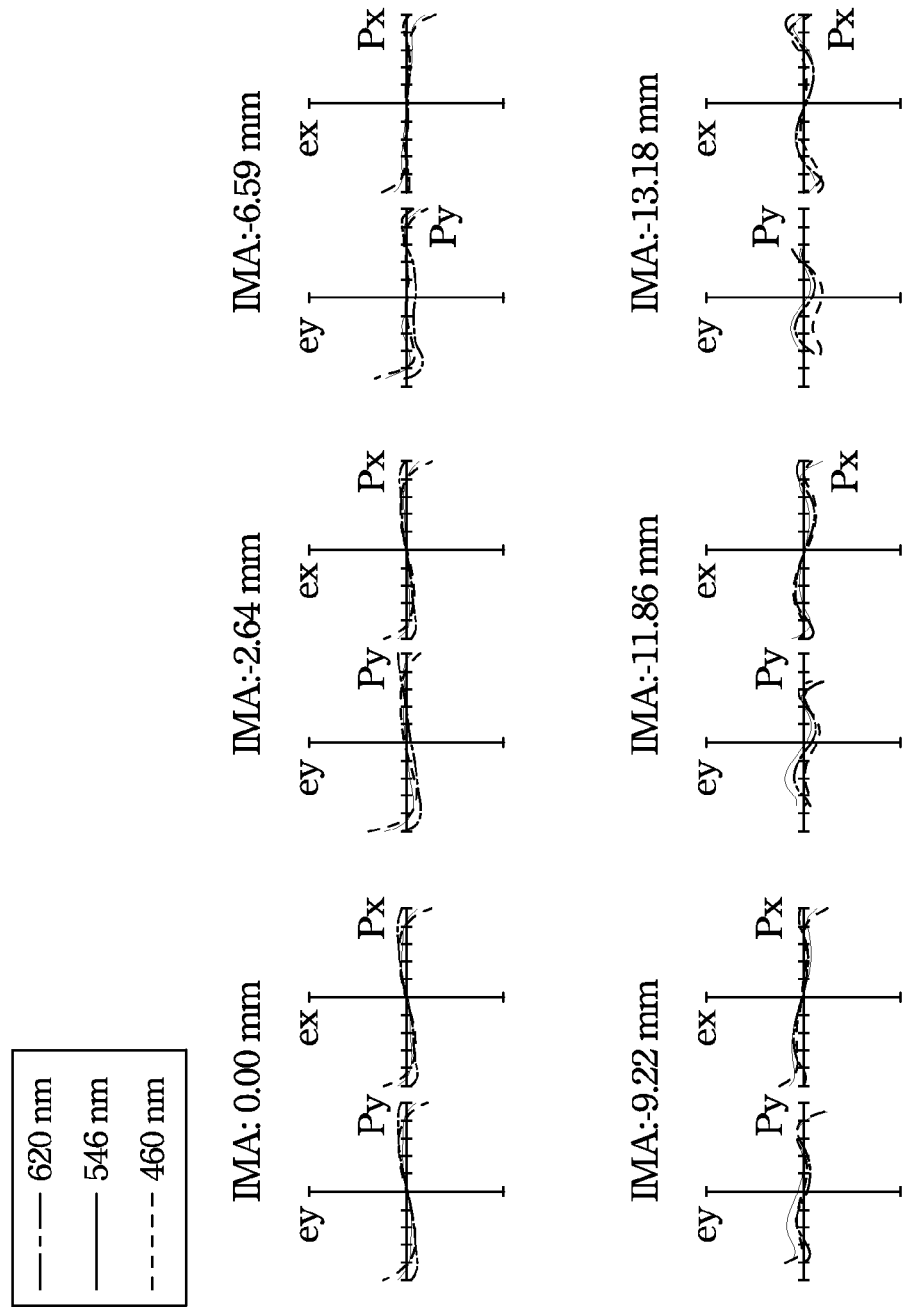
FIG. 11 shows transverse ray fan plots of the projection zoom lens of the projector of FIG. 2 at the telephoto position and with the parameter values listed in Table 2.

FIG. 11 shows transverse ray fan plots of the projection zoom lens 200 of the projector of FIG. 2 at the telephoto position and with the parameter values listed in Table 2, wherein the transverse ray fan plots are obtained at different image heights of the image surface. As shown in FIG. 11, the spherical aberration, chromatic aberration, and the coma for blue light (the wavelength is 460 nm in this example), green light (the wavelength is 546 nm in this example), and red light (the wavelength is 620 nm in this example) are all well controlled.

Figure 12:
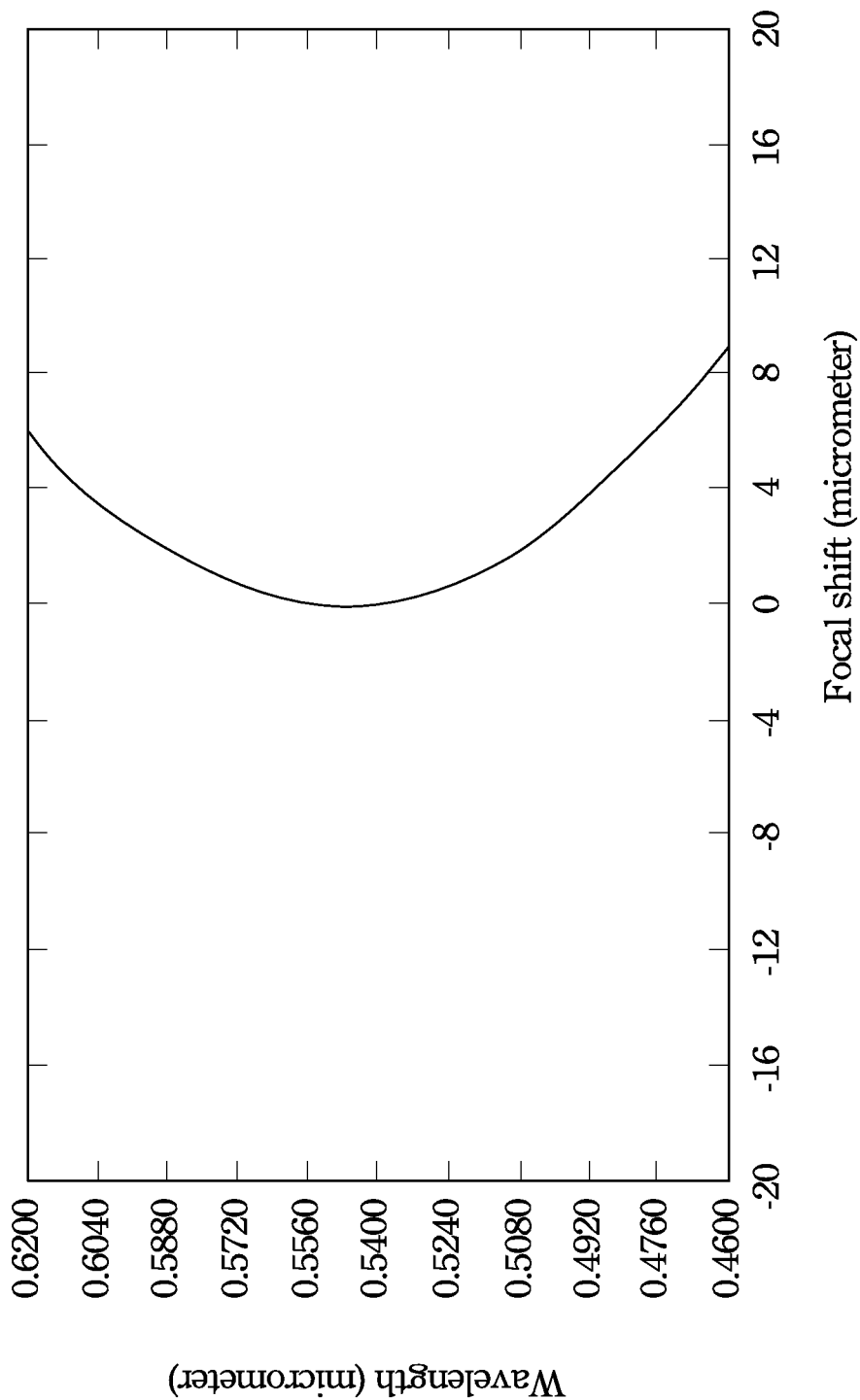
FIG. 12 shows chromatic focal shifts of the projection zoom lens of the projector of FIG. 2 at the telephoto position and with the parameter values listed in Table 2.

FIG. 12 shows chromatic focal shifts of the projection zoom lens 200 of the projector of FIG. 2 at the telephoto position with the parameter values listed in Table 2, wherein the chromatic focal shifts are obtained at different visible light wavelengths. As shown in FIG. 12, the focal shifts are below 10 µm.

In summary, through the combination of the six lens groups, the projection zoom lens 200 according to the above embodiments of the invention can obtain a back focal length that is longer than conventional lenses. In addition, the length of the back focal length is about 2.3 times that of the efficient focal length. Therefore, it is possible to provide enough space for disposing the prism 700 between the micro-display device 800 and the projection zoom lens 200. In addition, the resolution of the projector is raised. Moreover, since the sixth lens group 480 is a combination of an achromatic lens 481 and two low dispersion lenses (the fourteenth lens 486 and the fifteenth lens 491), the axial color aberration, the lateral chromatic aberration, and the spherical aberration are improved. The simulation results also indicate that the optical parameters of the projection zoom lens 200 at the wide-angle position and at the telephoto position are well controlled to within reasonable ranges.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A projection zoom lens comprising:
   a front lens group having negative refractive power and disposed adjacent to an object side of the projection zoom lens, the front lens group comprising:
      a first lens group having negative refractive power and disposed adjacent to the object side of the projection zoom lens;
      a second lens group having positive refractive power and disposed adjacent to an image side of the first lens group, wherein the second lens group is movable in order to compensate for a shift of a focal plane of the projection zoom lens; and
      a third lens group having positive refractive power and disposed adjacent to an image side of the second lens group;
   a rear lens group having positive refractive power and disposed adjacent to an image side of the projection zoom lens, the rear lens group comprising:
      a fourth lens group having negative refractive power and disposed adjacent to an image side of the third lens group;
      a fifth lens group having positive refractive power and disposed adjacent to an image side of the fourth lens group; and
      a sixth lens group having positive refractive power and disposed adjacent to the image side of the projection zoom lens; and
   an aperture stop disposed between the front lens group and the rear lens group,
   wherein the third lens group, the fourth lens group, and the fifth lens group move along an optical axis of the projection zoom lens to change an effective focal length of the projection zoom lens during zooming of the projection zoom lens.

2. The projection zoom lens of claim 1, wherein the first lens group comprises:
   a first lens which is a convex-concave lens with negative refractive power, wherein the first lens is disposed adjacent to the object side of the projection zoom lens;
   a second lens which is a biconvex lens with positive refractive power, wherein the second lens is disposed adjacent to an image side of the first lens;
   a third lens which is a convex-concave lens with negative refractive power, wherein the third lens is disposed adjacent to an image side of the second lens; and
   a fourth lens which is a biconcave lens with negative refractive power, wherein the fourth lens is disposed adjacent to an image side of the third lens.

3. The projection zoom lens of claim 1, wherein the second lens group comprises:
   a fifth lens which is a biconcave lens with negative refractive power, wherein the fifth lens is disposed adjacent to the image side of the first lens group; and
   a sixth lens which is a biconvex lens with positive refractive power, wherein the sixth lens is disposed adjacent to an image side of the fifth lens, and the fifth lens and the sixth lens are paired together to form a doublet lens.

4. The projection zoom lens of claim 1, wherein the third lens group comprises:
   a seventh lens which is a biconvex lens with positive refractive power, wherein the seventh lens is disposed adjacent to the image side of the second lens group.

5. The projection zoom lens of claim 1, wherein the fourth lens group comprises:
   an eighth lens which is a biconcave lens with negative refractive power, wherein the eighth lens is disposed adjacent to the image side of the third lens group; and
   a ninth lens which is a biconvex lens with positive refractive power, wherein the ninth lens is disposed adjacent to an image side of the eighth lens.

6. The projection zoom lens of claim 1, wherein the fifth lens group comprises:
   a tenth lens which is a biconcave lens with negative refractive power, wherein the tenth lens is disposed adjacent to the image side of the fourth lens group; and
   an eleventh lens which is a biconvex lens with positive refractive power, wherein the eleventh lens is disposed adjacent to an image side of the tenth lens.

7. The projection zoom lens of claim 1, wherein the sixth lens group comprises:
   a twelfth lens which is a biconcave lens with negative refractive power, wherein the twelfth lens is disposed adjacent to an image side of the fifth lens group;
   a thirteenth lens which is a biconvex lens with positive refractive power, wherein the thirteenth lens is disposed adjacent to an image side of the twelfth lens, and the twelfth lens and the thirteenth lens are paired together to form an achromatic lens;
   a fourteenth lens which is a biconvex lens with positive refractive power, wherein the fourteenth lens is disposed adjacent to an image side of the thirteenth lens; and
   a fifteenth lens which is a biconvex lens with positive refractive power, wherein the fifteenth lens is disposed adjacent to the image side of the projection zoom lens.

8. The projection zoom lens of claim 7, wherein the material of the twelfth lens is flint glass, and the material of the thirteenth lens is crown glass.

9. The projection zoom lens of claim 1, wherein the third lens group, the fourth lens group, and the fifth lens group move toward the object side of the projection zoom lens along the optical axis of the projection zoom lens during zooming of the projection zoom lens from a wide-angle position toward a telephoto position, and the moving distances of the third lens group, the fourth lens group, and the fifth lens group are different from each other; and
   the third lens group, the fourth lens group, and the fifth lens group move toward the image side of the projection zoom lens along the optical axis of the projection zoom lens during zooming of the projection zoom lens from the telephoto position toward the wide-angle position, and the moving distances of the third lens group, the fourth lens group, and the fifth lens group are different from each other.

* * * * *